(12) United States Patent
Doi (10) Patent No.: US 7,412,081 B2
(45) Date of Patent: Aug. 12, 2008

(54) PERSONAL AUTHENTICATION APPARATUS AND PERSONAL AUTHENTICATION METHOD

(75) Inventor: Miwako Doi, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 584 days.

(21) Appl. No.: 10/462,620

(22) Filed: Jun. 17, 2003

(65) Prior Publication Data

US 2004/0062423 A1    Apr. 1, 2004

(30) Foreign Application Priority Data

Sep. 27, 2002    (JP)    ............................ 2002-282443

(51) Int. Cl.
*G06K 9/00*    (2006.01)
(52) U.S. Cl. ...................... 382/118; 382/115
(58) Field of Classification Search ................. 382/118, 382/115; 396/2
See application file for complete search history.

(56) References Cited

U.S. PATENT DOCUMENTS 5,446,515 A * 8/1995 Wolfe et al. ..................... 396/2
6,445,810 B2 * 9/2002 Darrell et al. ................ 382/115
6,898,299 B1 * 5/2005 Brooks ......................... 382/115
2003/0039380 A1 * 2/2003 Sukegawa et al. ............ 382/118

FOREIGN PATENT DOCUMENTS

JP    9-251534    9/1997
JP    11-175718    7/1999

* cited by examiner

*Primary Examiner*—Matthew C. Bella
*Assistant Examiner*—Claire Wang
(74) *Attorney, Agent, or Firm*—Oblon, Spivak, McClelland, Maier & Neustadt, P.C.

(57) ABSTRACT

A personal authentication apparatus includes a facial region extraction which extracts an image of a facial region of a person obtained from image sensing input unit, a guide unit which guides motion of the person of interest, a feature amount extraction unit which extracts the feature amount of a face from the image of the facial region extracted by the facial region extraction unit while the motion is guided by the guide unit, a dictionary registration unit which registers the feature amount extracted by the feature amount extraction unit as a feature amount of the person of interest, and an authentication unit which authenticates the person of interest in accordance with the similarity between the feature amount extracted by the feature amount extraction unit, and a feature amount which is registered by the dictionary registration unit.

10 Claims, 10 Drawing Sheets

PERSONAL AUTHENTICATION APPARATUS AND PERSONAL AUTHENTICATION METHOD

CROSS-REFERENCE TO RELATED APPLICATIONS

This application is based upon and claims the benefit of priority from the prior Japanese Patent Application No. 2002-282443, filed Sep. 27, 2002, the entire contents of which are incorporated herein by reference.

BACKGROUND OF THE INVENTION

1. Field of the Invention

The present invention relates to a personal authentication apparatus and personal authentication method, which can implement registration and a personal authentication method with high reproducibility.

2. Description of the Related Art

In recent years, interests and demands about the security technique are growing. There are some personal authentication methods that assure security. In a personal authentication system that uses a magnetic card such as a credit card or the like, or a contact type IC card with a built-in IC chip, a user must insert such card into a reader. When the user has his or her hands full with some pieces of baggage, the operation for inserting the card into the reader is troublesome and very inconvenient. In a personal authentication system that uses a non-contact type IC card represented by a commuter pass ticket examination system using a wireless communication, the user need not manually insert the card into a reader unlike the system that uses the contact type IC card. However, if the user loses his or her card, such card may be illicitly used as in the contact type. Also, the user must always carry the IC card.

By contrast, a personal authentication system that uses biometric information (biometrics) such as a fingerprint, iris, voice, face, and the like is known. In this system, the iris pattern of the user is registered in an authentication apparatus in advance, and is verified upon authentication. This authentication system can assure authentication precision 10 times as high as fingerprints. However, in order to assure high authentication precision, the eye must be irradiated with auxiliary light, and the user must bring his or her face into contact with an authentication apparatus. Hence, the system forces the user to take given authentication actions, and cannot assure user's hygiene. For this reason, such authentication system is used for only some limited users who require very high security. Recently, a non-contact authentication system which authenticates the user by sensing an image of the user's eye using a camera is available. However, in case of such non-contact system, since the image sensing condition of the user by the camera is unstable, sufficiently high authentication precision cannot be assured.

In a system that uses user's fingerprint information, the user touches a reader with his or her finger to sense its fingerprint, and can be authenticated by matching feature points. This system is unsusceptible to physical growth and aging as in the iris pattern. However, since the user's skin touches the contact surface of a detection device with his or her finger, the contact surface is contaminated with fat and sweat of the hand, and the precision deteriorates during use. Since the users directly touch the detection surface with fingers, some users may hate to use such system in terms of hygiene. If the hand of a person to be authenticated is dry, his or her finger cannot well contact the detection surface, and a fingerprint cannot be satisfactorily read.

In a personal authentication system using user's voice/utterance information, the authentication precision depends on user's physical conditions. For example, even the same person may often have lower voice reproducibility (e.g., a person may have a hoarse voice due to cold or hangover). For this reason, speaker recognition has a problem with its authentication precision, and has not been developed to a practical level.

In a personal authentication system that uses user's facial information, the user need not directly physically touch an authentication apparatus, and the user's facial image which is sensed by a camera need only be analyzed to authenticate that user. Therefore, compared to other systems, the load on the user can be lightened, and such system can be relatively easily used to open/close a gate. Such personal authentication system using user's facial information is described in, e.g., Jpn. Pat. KOKAI Publication Nos. 9-251534 and 11-175718.

In order to improve the authentication precision of the authentication system that utilizes a facial image, a facial image with a large information size must be sensed, and pixels equal to or larger than a predetermined value in number are required. However, when the height of the user is relatively higher than the camera position for image sensing or when the standing position of the user is far from the camera, a facial image to be sensed is small, the number of pixels of the facial image is also small and, hence, a given image information size cannot be assured, thus impairing the recognition precision. If the standing position of the user or the illumination condition of the image sensing site is different from that upon registration, i.e., the image sensing conditions between registration and authentication are largely different, the obtained image information varies, and personal authentication consequently fails.

If the user creates another facial expression upon sensing a facial image, the obtained facial pattern changes. Therefore, in order to improve the precision of personal authentication, various facial expressions must be registered upon registering a dictionary of a given user. Upon registering various facial expressions, if the user is strained, his or her expression looks stern. As a result, expected facial expressions cannot be registered, and a facial expression upon authentication becomes largely different from that upon registration, thus disturbing improvement in recognition precision. Conversely, if the system asks for user's cooperation to sense various facial expressions upon registering a dictionary, some users overreact, and a facial expression upon overreaction becomes largely different from that upon authentication.

BRIEF SUMMARY OF THE INVENTION

It is an object of the present invention to provide a personal authentication apparatus and personal authentication method, which can improve the authentication precision by reducing the load on the user.

According to the first aspect of the present invention, a personal authentication apparatus comprises: facial region extraction unit configured to extract an image of a facial region of a person obtained from image sensing input unit; guide unit configured to guide motion of the person of interest; feature amount extraction unit configured to extract a feature amount of a face from the image of the facial region extracted by the facial region extraction unit while the motion is guided by the guide unit; dictionary registration unit configured to register the feature amount extracted by the feature amount extraction unit as a feature amount of the person of interest; and a unit configured to authenticate the person of interest in accordance with a similarity between the feature amount extracted by the feature amount extraction unit, and a feature amount registered by the dictionary registration unit.

According to the second aspect of the present invention, a personal authentication method comprises: extracting an image of a facial region of a person obtained from image sensing input means; guiding motion of the person of interest; extracting a feature amount of a face from the extracted facial region while the motion is guided; and authenticating the person of interest in accordance with a similarity between the extracted feature amount extracted by the feature amount extraction means, and a feature amount of the person of interest which is registered in advance.

DETAILED DESCRIPTION OF THE INVENTION

Preferred embodiments of the present invention will be described hereinafter with reference to the accompanying drawings.

The first embodiment of the present invention will be described first.

Figure 1:
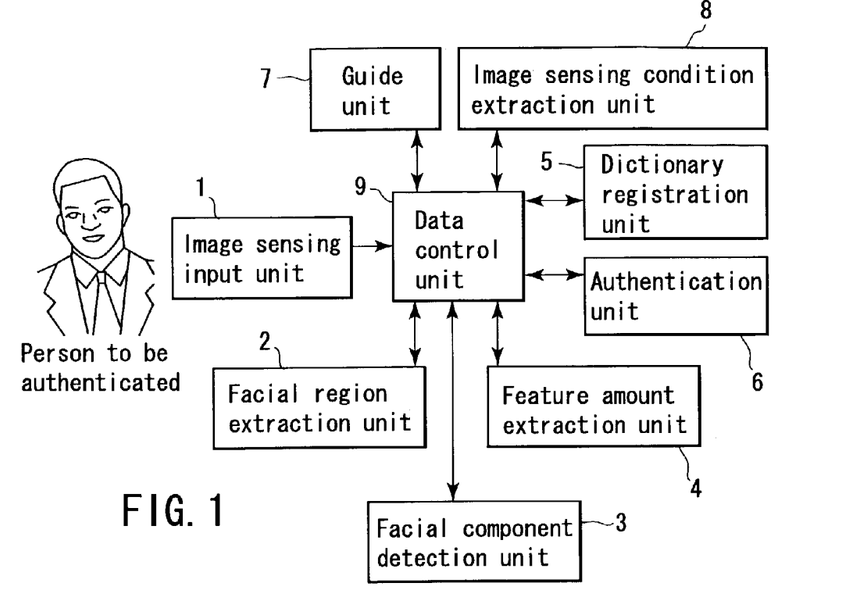
FIG. 1 is a schematic diagram of the first embodiment of the present invention.

FIG. 1 shows a schematic arrangement of the first embodiment. An image sensing input unit 1 inputs a facial image of a user (person to be authenticated) upon registration and authentication, and comprises a CCD camera used to acquire a moving image, still image, or the like, lighting equipment used to light up an image sensing space of the user, and the like. An analog image signal sensed by a CCD or CMOS camera is converted into a digital signal by an analog/digital conversion unit such as an image input board, and the digital image signal is stored in an image memory. The image memory may be mounted on the image input board, or may use an internal memory or external storage device of a computer corresponding to an information management unit 9.

A facial region extraction unit 2 detects a facial image region or head image region from an image of the person to be authenticated, which is stored in the image memory. There are some facial region extraction methods. For example, when a sensed image is a color image, a method using color information is available. More specifically, the sensed color image is converted from an RGB color space which is specified by three components Red, Green, and Blue into an HSV color space which specified by three components Hue (color appearance, hue), Saturation (saturation), and Value (lightness). The converted image is segmented by region segmentation into a facial image region, head hair region, and the like using color information such as hue, saturation, and the like. Then, a facial region is detected from the segmented partial regions using a region growing method or the like. In the region growing method, a target figure (region) is extracted by combining pixels having similar natures around an appropriately designated pixel (start pixel) in turn (or by expanding a region of that region to surrounding pixels). Details of the region growing method are described in, e.g., Junichiro Toriwaki "Three-dimensional Digital Image Processing", Jul. 5, 2002, Shokodo.

As another method of obtaining a facial region, a template for facial detection, which is prepared in advance, is moved in an image to calculate correlation values at respective positions. A region with the highest correlation value is determined to be a region with a high coincidence with the template, i.e., a facial region in the image. In still another method, distances or similarities may be calculated by an Eigenface method or subspace method in place of the correlation values to extract a region with the minimum distance or maximum similarity. In yet another method, near infrared light may be projected in addition to the CCD camera and a region corresponding to a face is extracted based on the reflected light. The present invention can adopt any of the aforementioned method or other methods.

A facial component detection unit 3 detects facial components such as eyes, a nose, a mouth, and the like from the image of the facial region. For example, the eye positions are detected from the image of the facial region extracted by the facial region extraction unit 2. As the detection method, a method based on pattern matching as in the above extraction method, a method described in a reference (Kazuhiro Fukui & Osamu Yamaguchi, "Facial Feature Point Extraction by Combination of Shape Extraction and Pattern Matching", IEICE Journal, Vol. J80-D-II, No. 8, pp. 2170-2177 (1997)), and the like may be used. In this embodiment, any of the aforementioned method or other methods may be used.

A feature amount extraction unit 4 extracts an image feature amount required for personal authentication from an input image. Based on the position of the facial region detected by the facial region extraction unit 2 and those of the facial components detected by the facial component detection unit 3, a region having a given size and shape is clipped. Density information of the clipped image is used as feature information. At least two components are selected from the facial components detected by the facial component detection unit 3. If a line segment that connects these two components falls within the range of the facial region extracted in advance at a given ratio, it is converted into an m (pixels)×n (pixels) region (m and n are integers equal to or larger than 1), which is used as a normalized pattern.

Figure 2A:
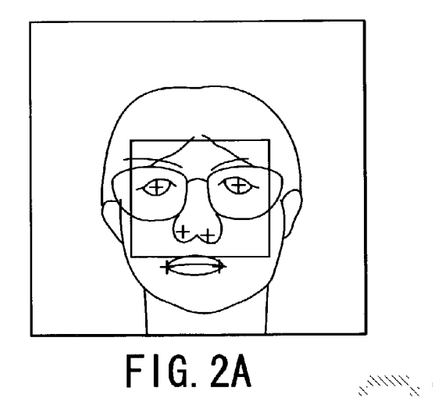
FIGS. 2A through 2D are explanatory views of facial region extraction in the first embodiment.
Figure 2B:
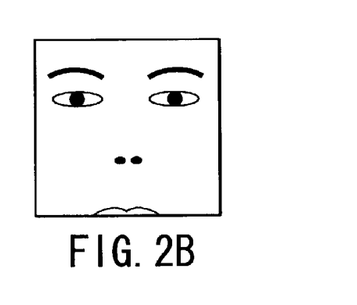
Figure 2C:
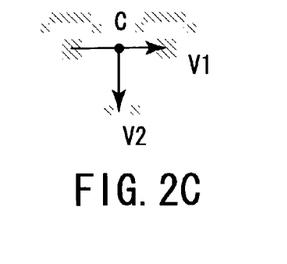
Figure 2D:
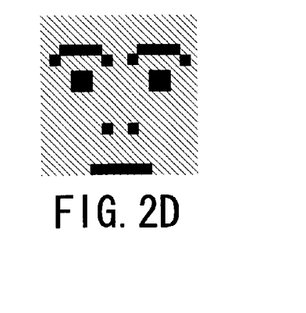

FIGS. 2A through 2D show an extraction example when the two eyes are selected as facial components in the facial region extraction method of the personal authentication apparatus. In FIG. 2A, a black rectangle which indicates the position of the facial region extracted by the facial region extraction means 2 is superimposed on the facial image of a person to be authenticated, which is sensed by the image sensing input means 1, and black cross lines indicating the positions of the facial components (eyes, nasal cavities, and mouth edges) extracted by the facial component detection unit 3 are further superimposed. FIG. 2B illustrates an image of the facial image. On such image of the facial region, let V1 be a vector which connects from the right eye to the left eye, and has a value corresponding to the distance from the right eye to the left eye, C be the central point of that vector, and V2 be a vector which is headed from C to the middle point between the two nasal cavities, as shown in FIG. 2C. If the distances from central point C of vector V1 to the respective components have a given ratio, (e.g., the ratio between the sizes of V1 and V2 falls within a predetermined range), it is determined that the region is a facial region which includes the two eyes and nasal cavities. Density pixel information is generated from that facial image, thus obtaining density pixel matrix information of m pixels×n pixels, as shown in FIG. 2D. The density pixel matrix information pattern shown in FIG. 2D will be referred to as a normalized pattern hereinafter.

Figure 3:
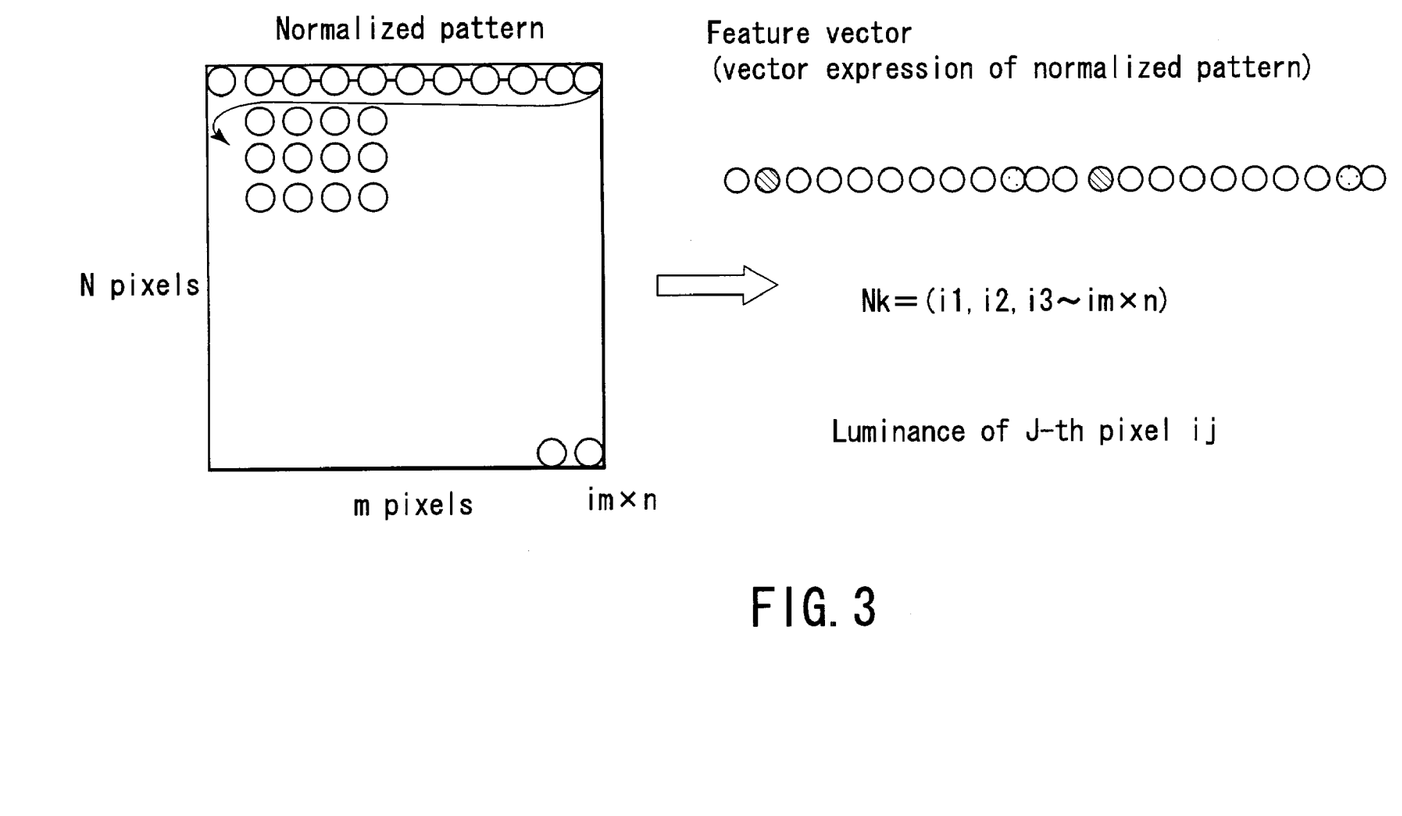
FIG. 3 is an explanatory view of a normalized pattern and feature vector in the first embodiment.

In this normalized pattern, the density values of elements (pixels) of an m (pixels)×n (pixels) matrix line up, as shown in the left figure of FIG. 3. When such matrix is converted into vector expression, the matrix is expressed by an (m×n)-dimensional vector, as shown in the right figure of FIG. 3. This feature vector Nk (k indicates the number of normalized patterns obtained for an identical person) is used in the subsequent processes.

A feature amount used in person recognition is a subspace obtained by lowering the number of data dimensions of an orthonormal vector, which is obtained by calculating a correlation matrix of feature vector Nk and then calculating an K–L expansion of that matrix. Note that correlation matrix C is given by:

$$C = \frac{1}{r}\sum_{k=1}^{r} N_k N_k^T$$

where r is the number of normalized patterns acquired for an identical person. By diagonalizing C, principal components (eigenvectors) are obtained. M out of these eigenvectors in descending order of eigenvalue are used as a subspace. This subspace is used as a personal authentication dictionary.

Referring back to FIG. 1, a dictionary registration unit 5 registers the feature amount extracted by the feature amount extraction unit 4 together with index information such as the ID number of the person of interest, spatial space (eigenvalues, eigenvectors, the number of dimensions, the number of sample data), and the like.

Figure 4:
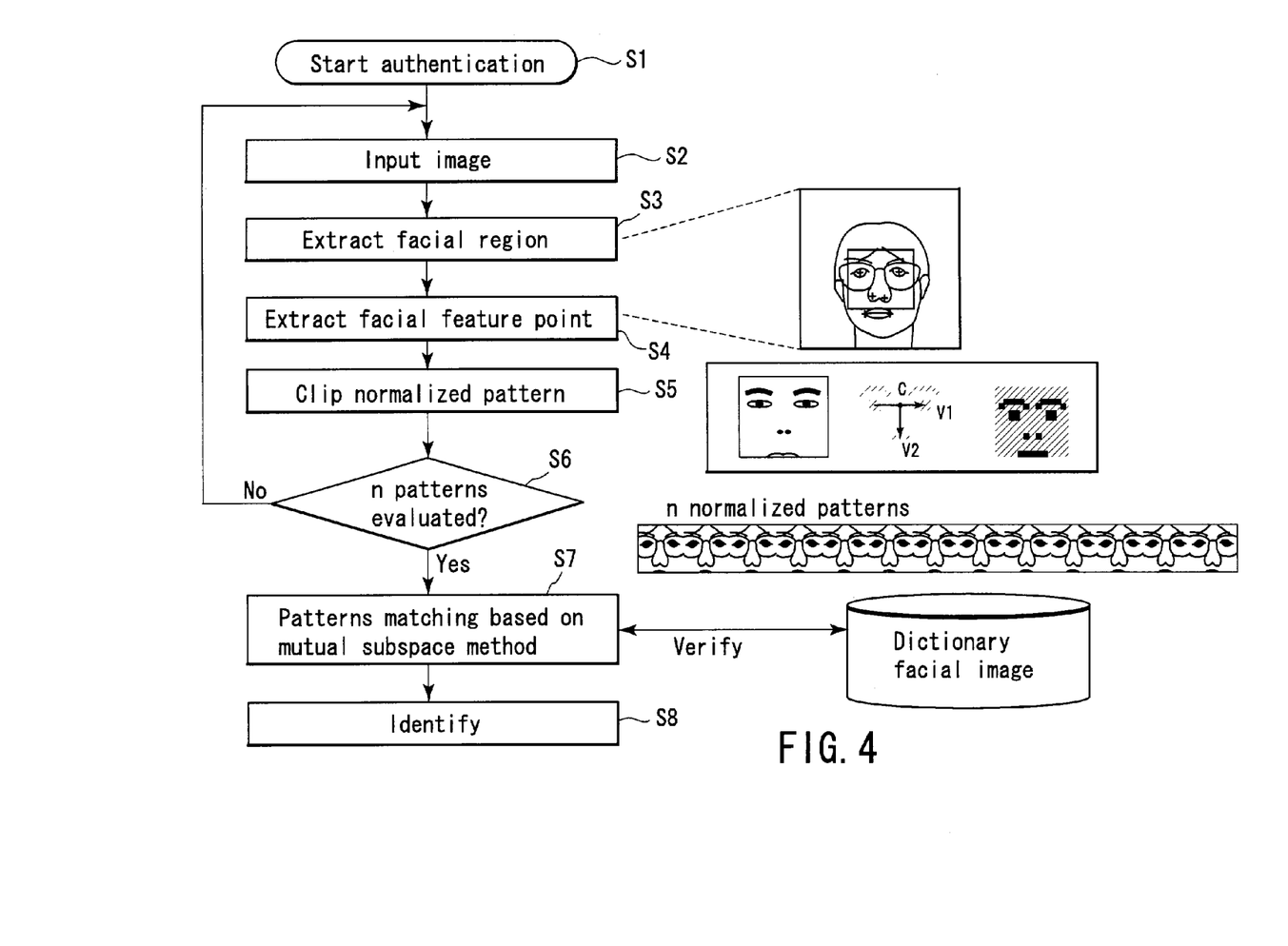
FIG. 4 is a recognition flow chart in the first embodiment.

An authentication unit 6 compares the feature amount registered in this dictionary and that extracted from the sensed facial image, and collates their similarity. FIG. 4 is a flow chart showing that process. When a person to be authenticated appears in front of the personal authentication apparatus of the present invention, an authentication procedure starts (step S1), and an image of the person to be authenticated is sensed and input to the authentication apparatus (step S2). A facial region is extracted from the input image by the aforementioned method (step S3), and an image feature amount required for personal authentication is extracted from the extracted facial region of the input image (step S4). In this way, an authentication data acquisition process is repeated (steps S5 and S6) until a predetermined number of (n) normalized patterns suited to verification are obtained. After the predetermined number of (n) normalized patterns of the person to be authenticated are obtained, pattern matching is made with a dictionary facial image of the person to be authenticated, which is registered in advance, by a mutual subspace method (step S7). If a predetermined similarity is obtained, the person to be authenticated is identified to be the person he or she claims to be; otherwise, the person to be authenticated is identified not to be the person he or she claims to be.

Figure 5:
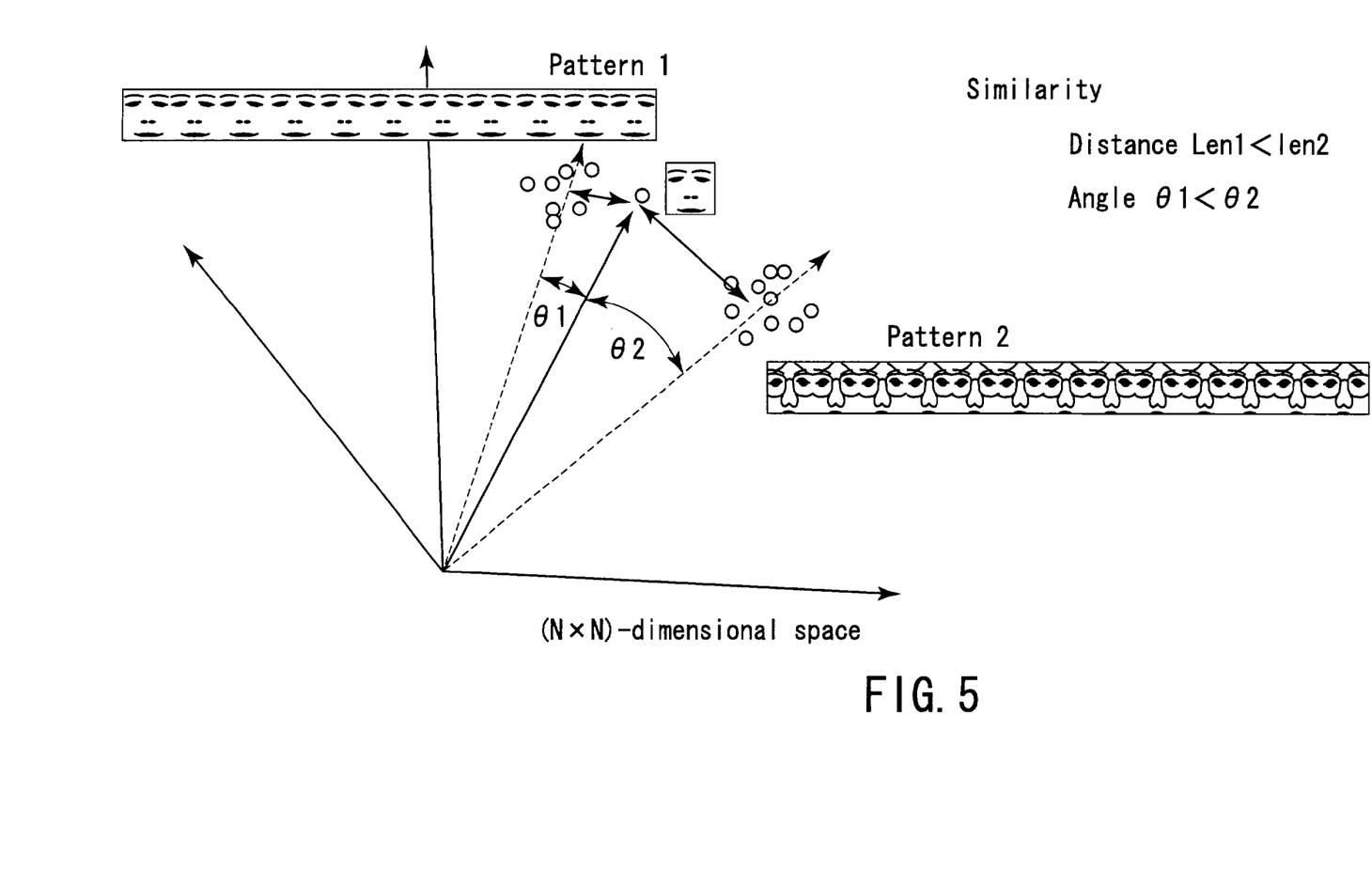
FIG. 5 is an explanatory view of a similarity in the first embodiment.

Note that the similarity is defined by distances and vector angles make in an M-dimensional subspace specified by a feature amount, as shown in FIG. 5. In FIG. 5, assume that data of person A having a feature amount expressed by "pattern 1" and that of person B having a feature amount expressed by "pattern 2" are registered in an (N×N)-dimensional space. Data of a person to be authenticated (a vector indicated by a black bold line in FIG. 5) is input. The differences (distances) between a vector indicating the data of the person to be authenticated and those expressed by patterns 1 and 2, and the like are calculated. Let len1 be the distance between the vector which indicates the data of the person to be authenticated, and that expressed by pattern 1, len2 be the distance between the vector which indicates the data of the person to be authenticated, and that expressed by pattern 2, θ1 be the angle the vector which indicates the data of the person to be authenticated makes with the vector expressed by pattern 1, and θ2 be the angle the vector indicating data of the person to be authenticated makes with the vector expressed by pattern 2. As can be seen from FIG. 5, since len1 is smaller than len2, and θ1 is smaller than θ2, a similarity between the person to be authenticated and person A is larger than that between the person to be authenticated and person B. In this manner, upon comparing the feature amount of the person to be authenticated with those of persons A and B, it is determined that the feature vector of the already registered person (person A and B) which has a smaller distance from and makes a smaller angle with that of the person to be authenticated has a higher similarity to that person, and that person is identical to the person to be authenticated, thus outputting a verification result.

When the facial image of a person to be authenticated is registered in a dictionary, the person to be authenticated normally inputs his or her ID number and stands at a position relatively near the image sensing input unit 1 to sense his or her face and to register the sensed image. By contrast, upon personal authentication, if the need for inputting the ID number is obviated, the person to be authenticated may undergo an authentication process at a position which is not so near the personal authentication apparatus. When the image sensing conditions of the person to be authenticated are largely different upon image registration and authentication, the feature amount of a face used by the authentication unit 6 becomes considerably different from that used in the dictionary registration unit 5 even for an identical person, and the person cannot often be recognized as a person he or she claims to be.

That is, when the standing position of the person to be authenticated upon registration is largely different from that upon authentication, the size of a person to be sensed and that of a facial region of the person contained in the sensed image are different. More specifically, an image sensed near the image sensing means upon registration includes a relatively small facial region. To prevent this, the size of the extracted facial region can be controlled to fall within a given range.

Also, the irradiation condition of light coming through a window largely varies depending on the hours (e.g., morning, daytime, evening, and the like) of the day. Also, outside light coming from the window also largely change depending on seasons. If outside light is too strong, a facial image sensed under such condition blurs by halation, and a facial region cannot be clipped from such image. To prevent this problem, the average luminance value of the extracted facial image can be controlled to fall within a given range.

In order to solve the aforementioned problems, it is effective to add an image sensing condition extraction unit 8 and guide unit 7. The image sensing condition extraction unit 8 extracts image sensing conditions which include standing positions upon registration and authentication and the like, and has a function of checking if the size and the average luminance value of the facial region extracted by the facial region extraction unit 2 fall within predetermined ranges. The guide unit 7 guides the person to be authenticated in accordance with the extracted image sensing conditions, so as to attain the same image sensing conditions upon dictionary registration and authentication.

Figure 6A:
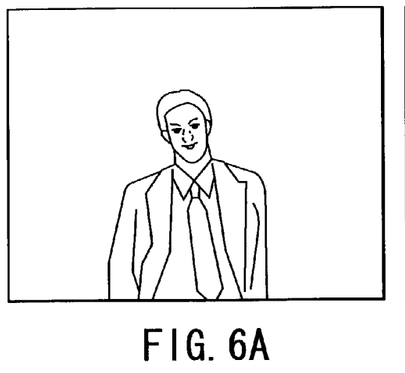
FIGS. 6A through 6C show an example of an interface upon registration in the first embodiment.
Figure 6B:
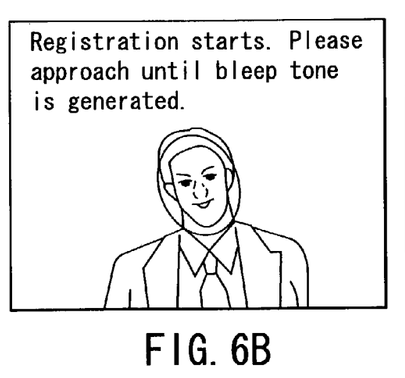
Figure 6C:
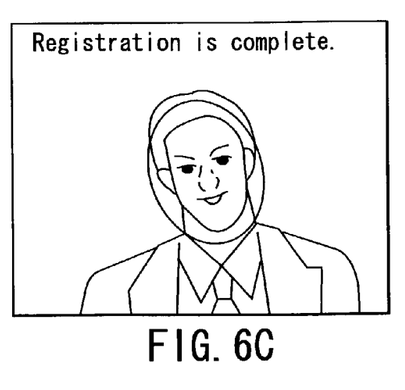

FIGS. 6A through 6C show an example of an interface used upon registering a facial image of a person to be authenticated in a dictionary when the person to be authenticated undergoes personal authentication while he or she stands near the personal authentication apparatus which is equipped in front of him or her. When the person to be authenticated stands near the personal authentication apparatus, as shown in FIG. 6A, the image of this person is displayed on a monitor, and the image sensing condition extraction means 8 calculates the size of a facial region to be extracted from the personal image input from the image input means and the average luminance value of pixels included in the facial region. When the size of the facial region to be extracted becomes larger than a predetermined size, or when the average luminance value of pixels becomes larger than a predetermined threshold value, it is determined that the person to be authenticated falls within an image sensing range. Then, as shown in FIG. 6B, an elliptic frame is superimposed near the facial region, and a bleep tone is generated to inform the person to be authenticated of the start of registration. In this case, the ID number and the like required to register this person are input prior to registration using a number input unit such as a ten-key pad and the like. Note that messages such as "registration start" and the like for the person to be authenticated are displayed on an upper portion of the screen, so that the person to be authenticated can look up not to hide his or her forehead with hair upon sensing a facial image (see FIGS. 6B and 6C).

After a predetermined number of images required for dictionary registration are acquired, bleep tones that inform the person of the end of registration are produced, and a message that advises accordingly is displayed, as shown in FIG. 6C. At that time, normalized patterns are extracted from the predetermined number of input images, an N-dimensional feature vector is generated, and a subspace is calculated and is registered in the dictionary by the dictionary registration unit 5.

Figure 7A:
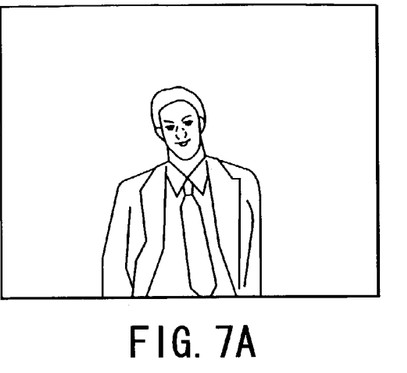
FIGS. 7A through 7C show an example of an interface upon authentication in the first embodiment.
Figure 7B:
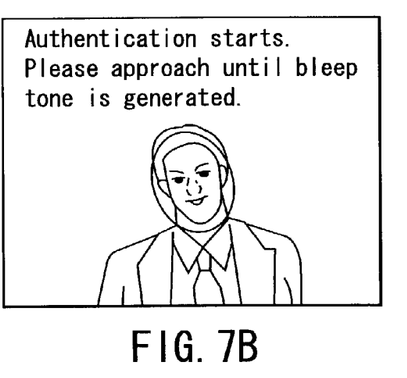
Figure 7C:
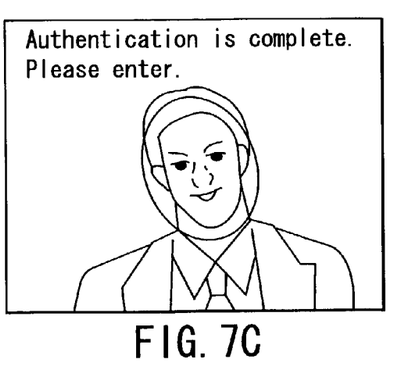

Upon authenticating a person, as shown in FIGS. 7A through 7C, the person to be authenticated proceeds to an authentication procedure while the image sensing condition extraction unit 8 monitors the facial image acquisition condition of the person. As shown in FIG. 7A, when the person to be authenticated approaches the personal authentication apparatus, the facial image acquisition condition of the person to be authenticated is monitored (e.g., the size of the facial region and the average luminance value of pixels are checked) by the same operation as that upon registration, and it is checked if the conditions such as the position, posture, and the like of the person to be authenticated match those for image sensing. The personal authentication procedure does not start before the person to be authenticated reaches a facial image sensing position. When the person to be authenticated has reached the facial image sensing position, a bleep tone is generated, and an elliptic frame is superimposed on the facial image of the person to be authenticated displayed on the monitor screen together with a message "authentication starts", thus starting the authentication procedure. After a predetermined number of authentication images are acquired, bleep tones are generated to inform the person of the end of the authentication procedure, and a message of the authentication result is displayed on the monitor screen.

Figure 13:
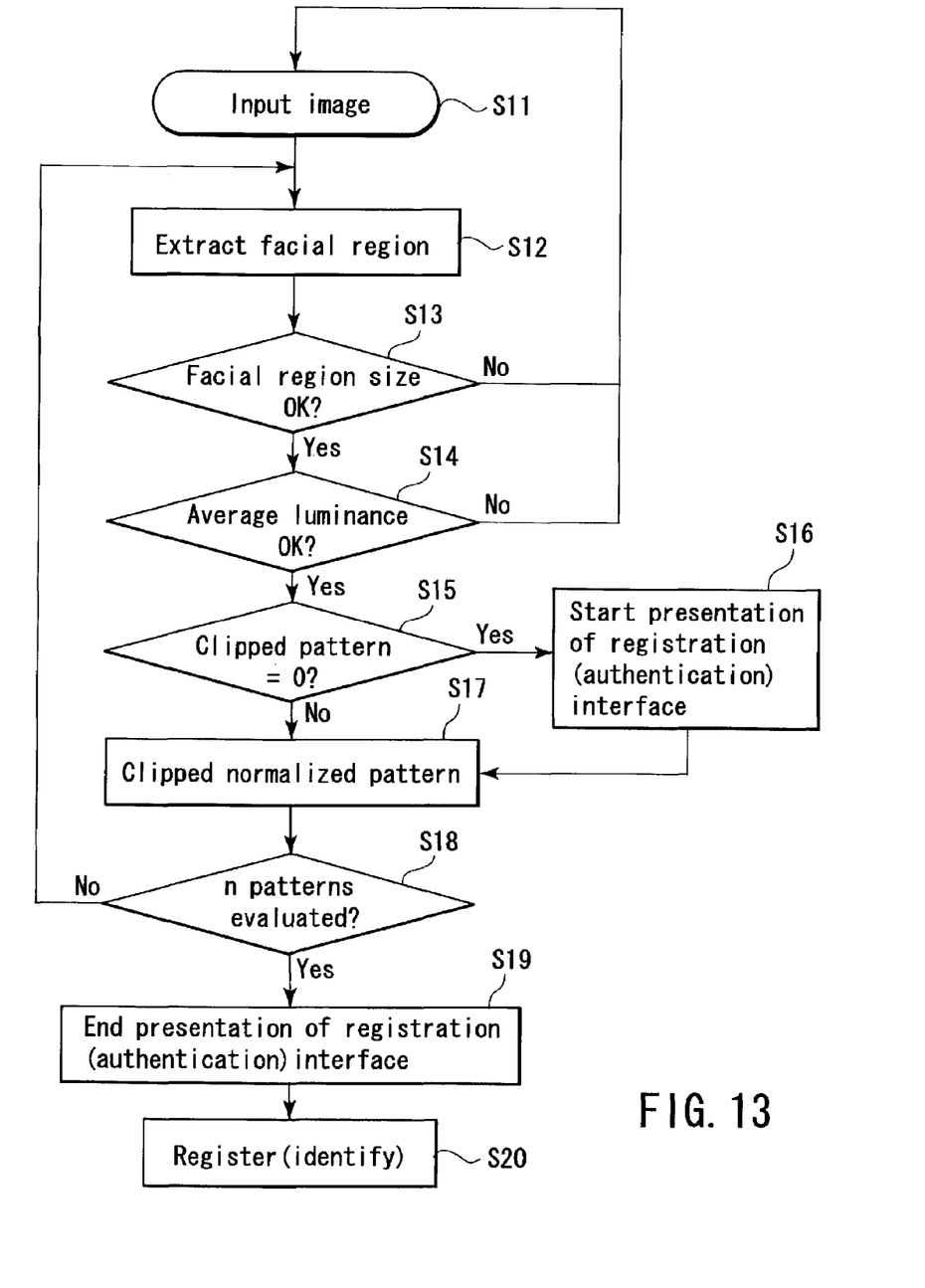
FIG. 13 is a flow chart showing the process of an image sensing condition extraction means and guide means in the first and second embodiments.

FIG. 13 is a flow chart showing the aforementioned dictionary registration process and personal authentication procedure. A facial region is extracted (step S12) from an input personal image of the person to be authenticated (step S11) using color information, a template, or the like. Upon registration, an image of a facial image with an image size equal to or larger than a predetermined size is extracted (step S13). If the average luminance value of the image of the facial region is equal to or larger than a predetermined value (step S14), a normalized pattern of the person to be authenticated is acquired until a predetermined number of normalized patterns are acquired. After that, the personal authentication procedure is completed by determining a similarity between the acquired normalized patterns and the already registered normalized patterns (step S20).

In the aforementioned registration/authentication procedure, when the person to be authenticated moves away from the image sensing apparatus or falls outside the image sensing range by loosing his or her balance after the registration/authentication procedure has started, image acquisition is canceled. In this case, a normalized pattern for registration or authentication is not calculated. After that, when the person to be authenticated meets the facial image acquisition conditions again, and is ready to acquire an image of the facial region, the registration/authentication process is repeated until a predetermined number of normalized patterns are generated.

In the above embodiment, since the image sensing means is set to locate the face of the person to be authenticated at nearly the center of the acquired image, the person to be authenticated is located in front of the personal authentication apparatus and approaches it. However, when the image sensing unit of the personal authentication apparatus is set on a wall in the neighborhood of an entrance, a facial image is acquired while the person to be authenticated obliquely looks in the image sensing unit. Hence, the standing position of the person to be authenticated may deviate not only in a direction to and from the image sensing device but also in the right-and-left directions. FIGS. 8A and 8B and FIGS. 9A and 9B show a case wherein a normalized pattern can be extracted only when the facial image is located at the central position of the acquired image, so as to match the image sensing conditions of the person to be authenticated in such environment.

Figure 8A:
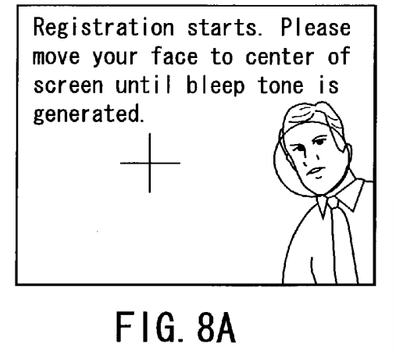
FIGS. 8A and 8B show another example of an interface upon registration in the first embodiment.
Figure 8B:
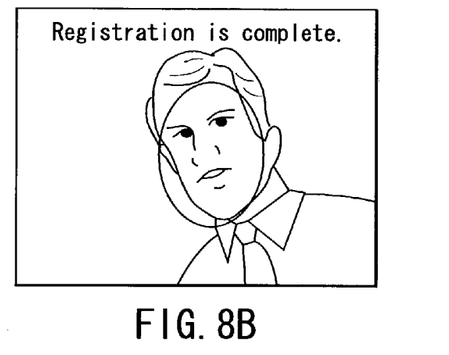

In FIG. 8A, when the facial image of the person to be authenticated is displayed on the monitor screen, a bleep tone is generated to inform the person of the start of the registration procedure, and a message that advises accordingly is displayed on the monitor. In addition, the facial image of the person to be authenticated, which is sensed by the image sensing unit is displayed on the monitor, and a message and cross mark which guide the position and posture of the person to be authenticated to locate the facial image at the center of the screen are displayed. When the facial image of the person to be authenticated is captured at the center of the screen, acquisition of the facial image, extraction of a feature amount, and registration of an authentication image start. After a predetermined number of data are acquired, bleep tones are generated, and a message that informs the person of the end of registration is displayed at the same time (see FIG. 8B).

Figure 9A:
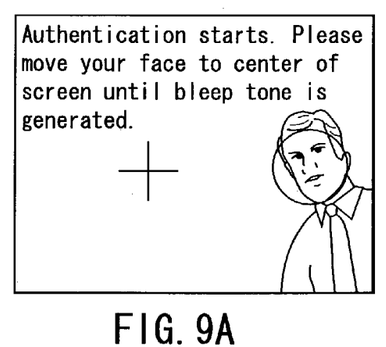
FIGS. 9A and 9B show another example of an interface upon authentication in the first embodiment.
Figure 9B:
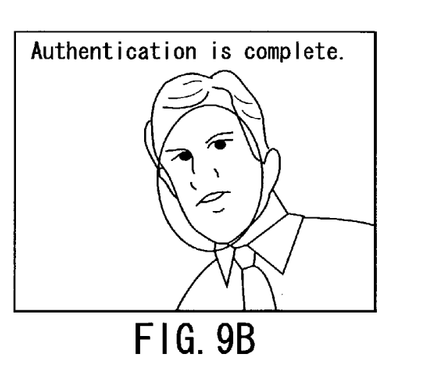

Upon authenticating a person, as in registration, when the person to be authenticated approaches the personal authentication apparatus, the position and posture of the person to be authenticated are guided so that the facial image of the person to be authenticated is located at the center of the sensed image (see FIG. 9A). When the facial image of the person to be authenticated is captured at the center of the screen, an authentication image is acquired, and the authentication procedure starts. After a similarity with registered data is determined, an audible message is generated, and the authentication result is displayed, thus ending the authentication procedure (see FIG. 9B).

The second embodiment of the present invention will be described below.

In the first embodiment, the facial image of the person to be authenticated, which is sensed upon dictionary registration or personal authentication, is displayed on the monitor, and the person to be authenticated is guided based on the displayed contents. However, many users may be strained when their facial images are displayed on the monitor in practice. Especially, since many users are strained upon dictionary registration, the facial expression upon personal authentication becomes different from that upon dictionary registration, and authentication often fails. Also, when the facial expression changes largely, since the mouth and eye positions apparently change, the feature vector changes, and authentication often fails. On the other hand, a shadow is often cast on a face due to the influences of hair style of the person to be authenticated and illumination, and the pixel values of the obtained image change largely due to the influence of illumination and shadow, thus impairing the authentication precision.

In order to solve such problems, by registering the facial image while moving the face of the person to be authenticated upon registration and authentication, the authentication precision can be improved. The second embodiment is an invention which is made to solve the above problems. More specifically, the guide unit 7 displays a character on the monitor in place of the facial image of the person to be authenticated, thereby guiding the person to be authenticated.

Figure 10A:
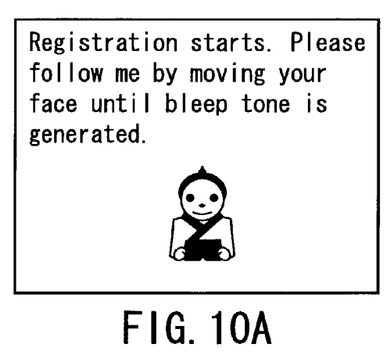
FIGS. 10A through 10E show an example of an interface upon registration in the second embodiment.
Figure 10B:
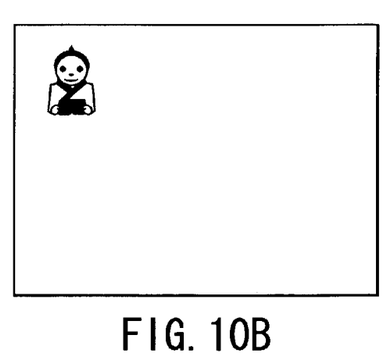
Figure 10C:
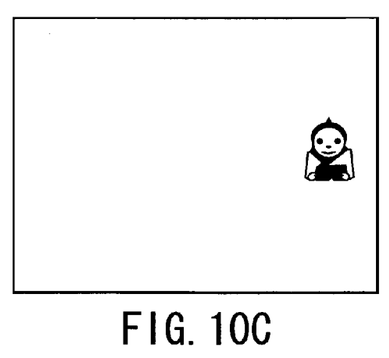
Figure 10D:
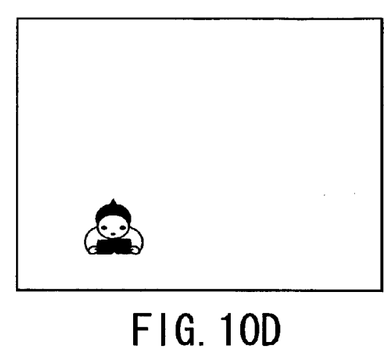
Figure 10E:
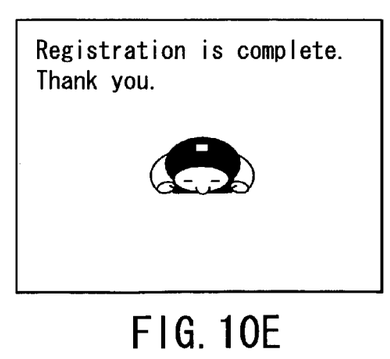

FIGS. 10A through 10E are views for explaining the guide sequence of the guide unit 7 upon dictionary registration. In FIG. 10A, when the dictionary registration procedure starts together with generation of a bleep tone, a message and character used to guide the motion of the face of the person to be authenticated are displayed on the monitor together with a message that indicates the start of registration. More specifically, the character is displayed to make a round clockwise along the circumference of the display region of the monitor. The person to be authenticated moves his or her face to follow the movement of the character (FIGS. 10B through 10D). During this interval, the personal authentication apparatus senses different facial images of the person to be authenticated, who looks up, down, and right, and left, extracts feature amounts, and generates normalized patterns. Upon completion of generation of a predetermined number of normalized patterns, which are to be registered in a dictionary, a message "end of registration" and a character are displayed, thus ending the registration procedure.

In this embodiment, the image sensing condition extraction unit 8 calculates an image sensing range on the basis of the size and the average luminance value of the facial region as in the first embodiment. That is, when the person to be authenticated approaches the image sensing range, the image sensing range is calculated. If it is determined that a facial image can be sensed, a character created by computer graphics (CG) or the like is displayed on the monitor in place of the facial image of the person and the elliptic frame. The character may move about in the screen until n normalized patterns are acquired in place of making a round along the circumference of the screen. In this case, when the apparatus guides the person to follow the motion of the character by moving not only eyes but also the face, facial images free from any non-uniformity against a change in illumination can be acquired. Furthermore, when a bowing character is displayed upon completion of the registration procedure, it can relax the person to be authenticated, and facial image data of the person to be authenticated can be acquired in a relatively relaxed state.

Figure 11A:
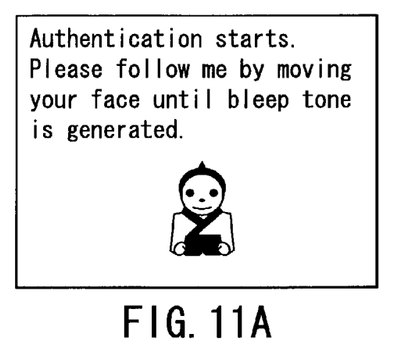
FIGS. 11A through 11E show an example of an interface upon authentication in the second embodiment.
Figure 11B:
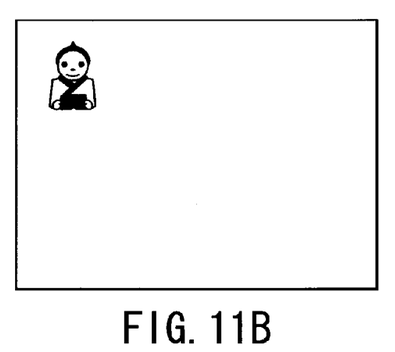
Figure 11C:
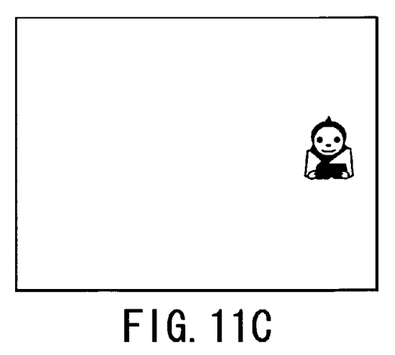
Figure 11D:
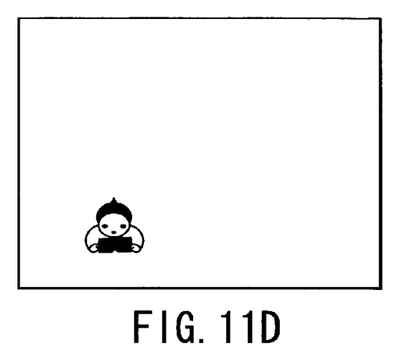
Figure 11E:
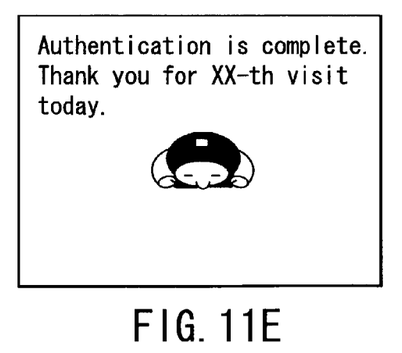

FIGS. 11A through 11E are views for explaining the guide procedure of the guide unit upon personal authentication. The basic procedure is the same as that upon dictionary registration. In FIG. 11A, when a personal authentication procedure starts, a character makes a round along the circumference of the monitor to guide the movement of the face of the person to be authenticated (FIGS. 11B through 11D). After a predetermined number of normalized patterns are acquired and an authentication result is obtained, a message "end of authentication" and a character are displayed (FIG. 1E).

Figure 12A:
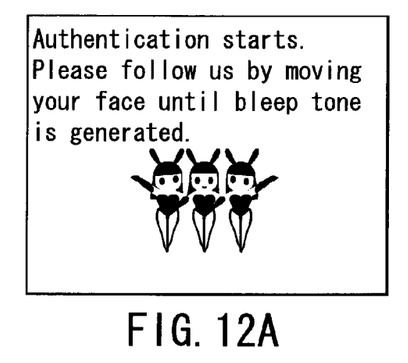
FIGS. 12A through 12E show another example of an interface upon authentication in the second embodiment.
Figure 12B:
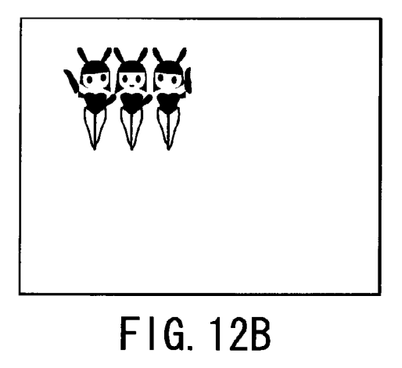
Figure 12C:
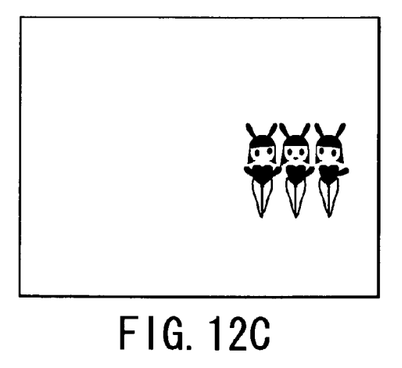
Figure 12D:
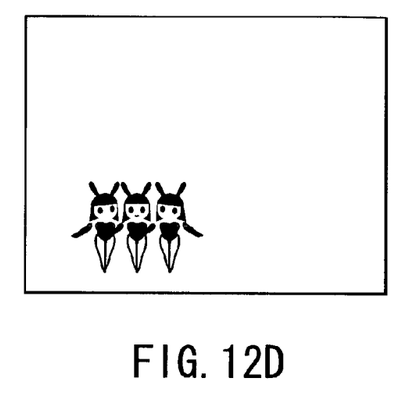
Figure 12E:
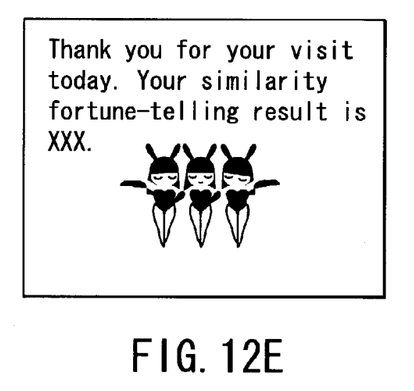

Upon completion of personal authentication, the number of times the person to be authenticated has passed the door may be presented, thus providing information that attracts the interest of the person to be authenticated. When the information that attracts the interest of the person to be authenticated is presented, the face of the person to be authenticated can be closer to the authentication apparatus, thereby further improving the authentication precision. Alternatively, as shown in FIGS. 12A through 12E, a plurality of different characters to be randomly displayed may be prepared, and are used daily or randomly, thus attracting the interest of the person to be authenticated. Also, as shown in FIG. 12E, fortune-telling using a similarity upon authentication (a better fortune-telling result can be obtained with increasing similarity) may be displayed to attract the interest of the person to be authenticated. With this arrangement, since the person to be authenticated stands at a position near the authentication apparatus and approaches his or her face to the monitor screen to look into it, the image sensing conditions upon registration and authentication can become stable, and a predetermined number of normalized patterns can be acquired easily, thus improving the authentication precision.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A personal authentication system comprising:
    a facial region extraction unit configured to extract images of a facial region of a person obtained from an image sensing input unit;
    a guide unit configured to guide motion of the person of interest;
    a feature amount extraction unit configured to extract a first feature amount of a face from a first image set of the facial region extracted by the facial region extraction unit;
    a dictionary registration unit configured to register the first feature amount extracted by the feature amount extraction unit from the first image set extracted while the motion is guided by the guide unit as a feature amount of the person of interest; and an authenticating unit configured to perform authentication using a second feature amount extracted at authentication from a second image extracted by the facial region extraction unit without guided motion and comparing said another second feature amount with the first feature amount extracted from the first image set extracted during guided motion and stored in the dictionary registration unit.

2. An apparatus according to claim 1, further comprising:
an image sensing condition extraction unit configured to extract an image sensing condition on the basis of a size or luminance of the facial region extracted by the facial region extraction unit, and
wherein the guide unit guides the motion of the person of interest so that the image sensing condition extracted by the image sensing condition extraction unit falls within a predetermined value range.

3. An apparatus according to claim 1, wherein the guide unit guides the motion of the person of interest by presenting a character which relaxes the person of interest upon registration or authentication.

4. An apparatus according to claim 1, wherein the guide unit displays the facial image of a person to be authenticated, which is sensed upon dictionary registration or personal authentication, on a monitor, and guides the person to be authenticated on the basis of displayed contents.

5. An apparatus according to claim 1, wherein the guide unit guides a person to be authenticated by displaying a character.

6. A personal authentication method comprising:
extracting a first image set of a facial region of a person obtained from an image sensing input means while motion is guided;
extracting a first feature amount of a face from the extracted first image set of the facial region;
registering the first feature amount extracted by the extracting a first feature amount as a feature amount of the person of interest;
second extracting a second image of a facial region of a person obtained from the image sensing input means without guided motion at an authentication; and
extracting a second feature amount of the facial region of the person obtained from the second image extracted from the sensing input means at the authentication; and
authenticating a person based on comparing said second feature amount with the registered first feature amount extracted from the first image set extracted during guided motion.

7. A method according to claim 6, further comprising:
extracting an image sensing condition on the basis of a size or luminance of the facial region extracted in the guide step, and
wherein the guide step includes a step of guiding the motion of the person of interest so that the image sensing condition extracted in the image sensing condition extraction step falls within a predetermined value range.

8. A method according to claim 6, wherein the guide step includes a step of guiding the motion of the person of interest by presenting a character which relaxes the person of interest upon registration or authentication.

9. A method according to claim 6, wherein the guide step includes a step of displaying the facial image of a person to be authenticated, which is sensed upon dictionary registration or personal authentication, on a monitor, and guiding the person to be authenticated on the basis of displayed contents.

10. A method according to claim 6, wherein the guide step includes a step of guiding a person to be authenticated by displaying a character.

\* \* \* \* \*